May 3, 1927.  
C. G. COFFIN ET AL  
1,627,273  
PLUG FOR LUBRICANT INLETS  
Filed July 29, 1924

Inventor  
Charlie G. Coffin,  
Joseph A. Wolf,  
By Royal E. Burnham,  
Attorney WITNESS:  
Chas. L. Griesbauer Patented May 3, 1927.

1,627,273

UNITED STATES PATENT OFFICE.

CHARLIE G. COFFIN AND JOSEPH A. WOLF, OF ELGIN, OKLAHOMA, ASSIGNORS OF ONE-THIRD TO DELBERT E. CLINE, OF ELGIN, OKLAHOMA.

PLUG FOR LUBRICANT INLETS.

Application filed July 29, 1924. Serial No. 728,938.

It is an object of the invention to provide a device, containing a passage constituting an inlet for lubricants, adapted to be associated with a part located in connection with a bearing or machinery and arranged to receive a threaded end of a grease-gun pipe or other means for supplying lubricant and at the same time reinforce comparatively thin walls of the part in which it is located.

Another object of the invention is to provide a plug for such a device that not only will close the passageway thereof, but also cover the exterior end portion and give a good appearance to the part with which it is associated.

The invention is adapted particularly for association with hub-caps in motor-vehicles, but it also is susceptible of other adaptation.

When considered in connection with the description herein, the characteristics of the invention are apparent from the accompanying drawing, forming part hereof, wherein an adaptation to a hub-cap is disclosed, for purposes of illustration.

Although the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawing, of which—

Figure 1:
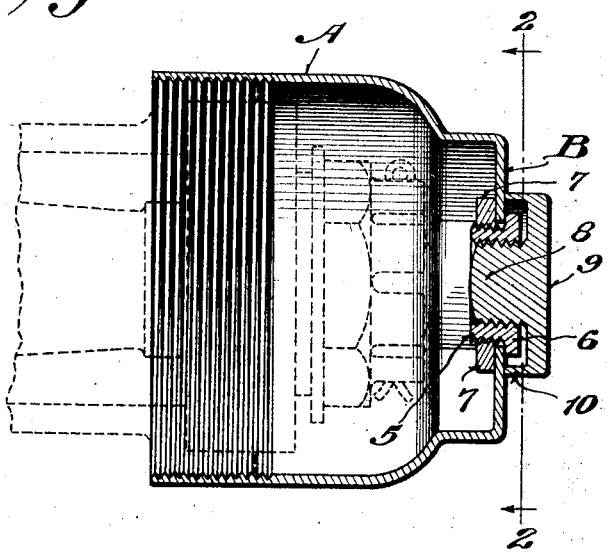
Fig. 1 is a longitudinal section of a hub-cap having the invention associated therewith.
Figure 2:
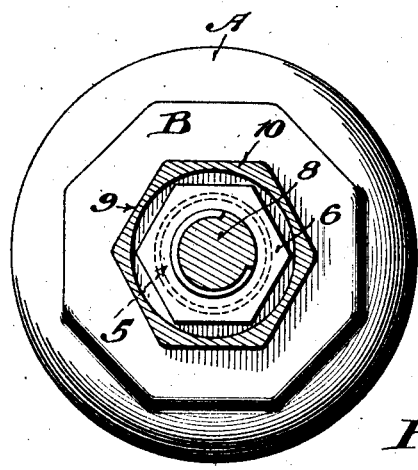
Fig. 2 is a section on the line 2—2, Fig. 1.
Figure 3:
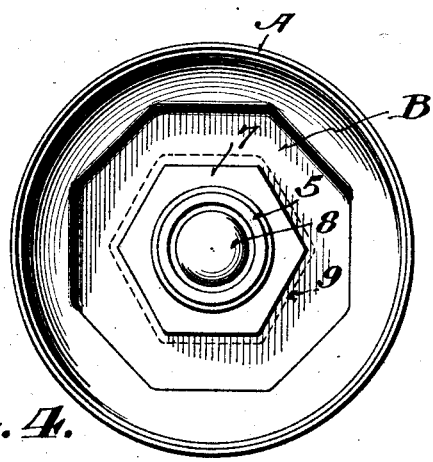
Fig. 3 is a view of the interior of the cap, looking toward the outer end.
Figure 4:
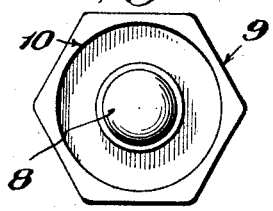
Fig. 4 is a view of the plug.

In the drawing, A designates a hub-cap and B an end wall thereof having an opening provided for injection of lubricant to bearings with which the interior of the cap communicates.

The invention provides for such a lubricant inlet a bushing 5, which fits snugly against the wall of the inlet and exteriorly and interiorly screw threaded. The bushing has a head or flange 6 integrally formed therewith, which bears against the outer side of the wall B and which is shaped to take a wrench or other turning-tool. The head or flange 6 is drawn and held against that wall by a nut 7 on the inner portion of the bushing bearing against the opposite or inner side of the wall.

The bushing affords a reinforcement for comparatively thin walls, such as those of hub-caps, and it is sufficiently strong to have the discharge-nipple of a grease-gun or the like screwed tightly thereinto and thus obviate leakage at that place during the lubricant-charging operation.

A threaded plug 8 is provided for closing the inlet through the bushing by being screwed thereinto, and it has a dish-shaped or concave head 9 arranged to envelope and cover the bushing-head or flange 6, the edge of a rim 10 of the head being drawn against the wall as the plug is turned into place. The plug-head is shaped to take a wrench or other turning-tool.

Having thus described our invention, what we claim as new, and desire to secure by Letters Patent, is—

1. The combination, with a wall having a lubricant inlet, of an exteriorly and interiorly threaded bushing in said inlet, a head and nut on said bushing contacting with opposite sides of said wall, a threaded plug turnable into and out of said bushing, and a head on said plug enveloping and covering the bushing part on the outside of said wall and having a rim arranged to seat against said wall.

2. The combination, with a comparatively thin walled metallic hub-cap having a lubricant inlet in its end wall, of an exteriorly and interiorly threaded bushing in said inlet, a head on said bushing bearing against one side of the hub-wall, a nut on said bushing bearing against the opposite side of said wall, a threaded plug turnable into and out of said bushing, and a concave head on said plug enveloping and covering the bushing part on the outside of said wall and having a rim seating at its edge against the hub-wall.

In witness whereof, we affix our signatures.

CHARLIE G. COFFIN.
JOSEPH A. WOLF.